(12) United States Patent
Ozawa et al.

(10) Patent No.: US 7,284,571 B2
(45) Date of Patent: Oct. 23, 2007

(54) VALVE DEVICE

(75) Inventors: Shigeru Ozawa, Nagano (JP);
Tetsuhiko Hara, Nagano (JP)

(73) Assignee: NIDEC Sankyo Corporation, Nagano (JP)

( * ) Notice: Subject to any disclaimer, the term of this patent is extended or adjusted under 35 U.S.C. 154(b) by 0 days.

(21) Appl. No.: 11/013,986

(22) Filed: Dec. 16, 2004

(65) Prior Publication Data

US 2005/0150558 A1 Jul. 14, 2005

(30) Foreign Application Priority Data

Dec. 19, 2003 (JP) ............................. 2003-422454

(51) Int. Cl.
*F16K 11/072* (2006.01)
(52) U.S. Cl. .................... 137/625.46; 251/65
(58) Field of Classification Search .......... 137/625.46, 137/625.47; 251/129.11, 65
See application file for complete search history.

(56) References Cited

U.S. PATENT DOCUMENTS 3,334,655 A * 8/1967 Eppendahl .................... 251/65
5,169,117 A * 12/1992 Huang .......................... 251/65
5,842,680 A * 12/1998 Bustamante et al. .......... 251/65
6,058,726 A * 5/2000 Noritake ..................... 137/870

OTHER PUBLICATIONS

Patent Abstracts of Japan; Publication No. 2002-349741 published Dec. 4, 2002 (Appln No. 2001-153996 May 23, 2001, Sankyo Seiki Mgf. Co. Ltd.).
Patent Abstracts of Japan; Publication No. 2003-021254 published Jan. 24, 2003 (Appln No. 2001-209219 Jul. 10, 2001, Sankyo Seiki Mgf. Co. Ltd.).

* cited by examiner

*Primary Examiner*—John Fox
(74) *Attorney, Agent, or Firm*—Reed Smith LLP (57) ABSTRACT

A valve device includes a main body case to which an inflow pipe and an outflow pipe are connected, a valve element which is disposed inside of the main body case to open or close an outflow aperture part of the main body case, a motor for moving the valve element in an open direction and a closed direction, a valve element drive means which is driven by the motor and includes a rotary member rotated by the motor and a rotation side permanent magnet mounted in the rotary member, a valve element side permanent magnet mounted in the valve element, and a holding member which movably holds the valve element. The valve element is urged in the open direction or the closed direction by a magnetic attractive force or a magnetic repulsive force generated between the rotation side permanent magnet and the valve element side permanent magnet.

23 Claims, 6 Drawing Sheets

VALVE DEVICE

CROSS-REFERENCE TO RELATED APPLICATIONS

This application claims priority to Japanese Application No. 2003-422454 filed Dec. 19, 2003, which is incorporated herein by reference.

BACKGROUND OF THE INVENTION a) Field of the Invention

The present invention relates to a valve device in which a valve element is operated to perform opening/closing of a flow path for various types of fluid. More specifically, the present invention relates to a valve element opening/closing mechanism for a valve device.

b) Description of the Related Art

A valve device has been known which performs a temperature control in a chamber which is in communication with a flow path by means of opening or closing the flow path for various types of fluid such as refrigerant for a refrigerator or an air conditioner. An inflow pipe for allowing the fluid to flow in and an outflow pipe allowing the fluid to flow out are connected to the valve device. The valve device includes a main body case within which a fluid flow path is constructed for guiding the fluid flowing from the inflow pipe to the outflow pipe, a valve element disposed on an inner side of the main body case for opening or closing an outflow aperture part of the main body case which is in communication with the outflow pipe, and a valve element drive means having a motor drive part for opening or closing the valve element.

One of the valve devices utilizes a so-called disk type of valve element opening/closing mechanism. In the disk type of valve element opening/closing mechanism, an outflow aperture part provided in a main body case is opened or closed by means that a disk-shaped valve element provided with a sliding face is rotationally slid on the valve seat plate of the main body case provided with the outflow aperture part by a valve element drive means with the rotation torque of the motor drive part through gears (for example, see Japanese Patent Laid-Open No. 2003-21254). Further, a so-called ball type of valve element opening/closing mechanism has been also used in which an outflow aperture part is opened or closed by a valve element drive means such that a spherical valve element urged against an outflow aperture part is moved by a cam provided on a rotary member driven by a motor (for example, Japanese Patent Laid-Open No. 2002-349741).

However, in the disk type of valve element opening/closing mechanism, a disk-shaped valve element is commonly formed of resin and a valve seat plate is formed of metal such as stainless steel to construct a sliding face between the valve element and the valve seat plate. Therefore, sliding resistance between the valve element and the valve seat plate varies depending on the degree of the surface roughness or the flatness of the sliding face and thus the torque required in the motor drive part also varies at a starting time or at an opening/closing operation time. Further, the sliding resistance increases due to the aged deterioration of the sliding face and therefore the required torque of the motor drive part increases at a starting time or at an opening/closing operation time. Accordingly, the stable opening/closing control of the valve element becomes difficult.

Also, in the ball type of valve element opening/closing mechanism, the spherical valve element is pressure contacted with the outflow aperture part by fluid pressure. Therefore, when the cam moves the valve element, the rotating torque larger than the fluid pressure is required in the motor drive part. Accordingly, when the fluid pressure varies, the contact resistance between the cam and the valve element varies and thus required torque of the motor drive part also varies. Especially when the fluid pressure is high, the required torque of the motor drive part increases and therefore, a stable opening/closing control of the valve element becomes difficult unless a motor drive part with a large rotating torque is used.

OBJECT AND SUMMARY OF THE INVENTION

In view of the problems described above, it is a primary object and advantage of the present invention to provide a valve device in which a valve element performs opening and closing operations of a flow path for various types of fluid with a simple construction, which is capable of restricting the variation of the torque required in the motor drive part and realizing a stable opening/closing operation of the valve element.

In order to achieve the above object and advantage, according to an embodiment of the present invention, there is provided a valve device including a main body case to which an inflow pipe allowing fluid to flow in and an outflow pipe allowing fluid to flow out are connected, a fluid flow path formed inside of the main body case for allowing the fluid flown in from the inflow pipe to flow to the outflow pipe, a valve element which is disposed inside of the main body case to open or close an outflow aperture part of the main body case which is in communication with the outflow pipe, a valve element drive means having a motor drive part for opening or closing the valve element, and a magnetic drive means included in the valve element drive means for generating an urging force to move the valve element in at least one of an open direction or a closed direction by using at least one of a magnetic attractive force and a magnetic repulsive force generated with permanent magnets.

In accordance with the embodiment of the present invention, an urging force in the open direction or in the closed direction is applied to the valve element by the magnetic drive means. Therefore, the opening/closing of the outflow aperture part can be performed by the valve element under the state that the mechanical connection between the valve element and the motor drive part of the valve element drive means is not performed. Accordingly, the variation of the torque required in the motor drive part is restricted even when a load such as the sliding resistance or the fluid pressure applied to the valve element varies. As a result, stable open/close control of the valve element is attained even when the motor drive part generating a large torque is not used.

In accordance with an embodiment of the present invention, the valve element drive means is preferably constructed such that a magnetic force generated by the magnetic drive means is interchanged between an attractive force and a repulsive force to reverse the direction of the urging force to drive the valve element in the open direction or in the closed direction.

In accordance with an embodiment of the present invention, the valve element drive means is provided with a rotary member which faces the valve element, and the magnetic drive means is provided with a rotation side magnet part which includes an N-pole and an S-pole at different angle positions of the rotary member and a valve element side magnet part. The magnetic drive means is constructed such that a magnetic force generated between the rotation side magnet part and the valve element side magnet part is interchanged between an attractive force and a repulsive force to drive the valve element in the open direction or in the closed direction. According to the construction described above, the movement of the valve element in the open direction and the closed direction can be performed under the state that the mechanical connection between the valve element and the rotary member is not performed. Accordingly, the variation of the torque required in the motor drive part is restricted even when a load such as the sliding resistance or the fluid pressure applied to the valve element varies. As a result, stable open/close control of the valve element is attained even when the motor drive part generating a large torque is not used.

In accordance with an embodiment of the present invention, the valve element is preferably disposed so as to move in an open position apart from the outflow aperture part and in a closed position where the outflow aperture part is closed. According to the construction described above, since the valve element performs the opening/closing of the fluid aperture part without sliding motion on the fluid aperture part, the degree of surface roughness, the flatness, time degradation of the sliding face or the like do not affect the opening/closing operation. Therefore, stable open/close control of the valve element is attained. In addition, in the embodiment of the present invention, the rotary member and the valve element are magnetically connected to each other and they are mechanically separated from each other. Therefore, even when a large fluid pressure is applied to the valve element, the affection to the torque required in the motor drive part can be restricted.

In accordance with an embodiment of the present invention, the valve element drive means is preferably constructed such that the valve element is moved in the closed direction by using the magnetic repulsive force generated between the rotation side magnet part and the valve element side magnet part and the valve element is moved in the open direction by using the magnetic attractive force generated between the rotation side magnet part and the valve element side magnet part.

In accordance with an embodiment of the present invention, the rotary member is preferably provided with a cam for engaging with the valve element at the closed position to move the valve element in the open direction. According to the construction described above, the opening operation of the valve element can be smoothly performed even when the fluid pressure is high. Further, since the cam gives only a trigger movement to the valve element for the opening operation, the affection due to the cam to the torque required in the motor drive part is restricted. In addition, when an inclined face part is formed on the cam to give the trigger movement to the valve element for the opening operation, the affection due to the cam to the torque required in the motor drive part is furthermore restricted.

In accordance with an embodiment of the present invention, a sealing member formed of an elastic member is preferably disposed between the valve element and the aperture side face part of the main body case in which the outflow aperture part is formed.

According to the present invention, the urging force in the open direction or in the closed direction is applied to the valve element by the magnetic drive means. Therefore, the opening/closing of the outflow aperture part can be performed by the valve element under the state that the mechanical connection between the valve element and the motor drive part of the valve element drive means is not performed. Accordingly, the variation of the torque required in the motor drive part is restricted even when a load such as the sliding resistance or the fluid pressure applied to the valve element varies. As a result, stable open/close control of the valve element is attained even when the motor drive part generating a large torque is not used.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIGS. 5(A), 5(B), 5(C), 5(D), 5(E) and 5(F) schematically show the opening/closing states of two valve elements when the rotary member respectively turns 0 step, 4 steps, 28 steps, 52 steps, 76 steps, and 87 steps from a home position.

DESCRIPTION OF THE PREFERRED EMBODIMENTS

A valve device in accordance with an embodiment of the present invention will be described below with reference to the accompanying drawings.

Entire Construction

Figure 1:
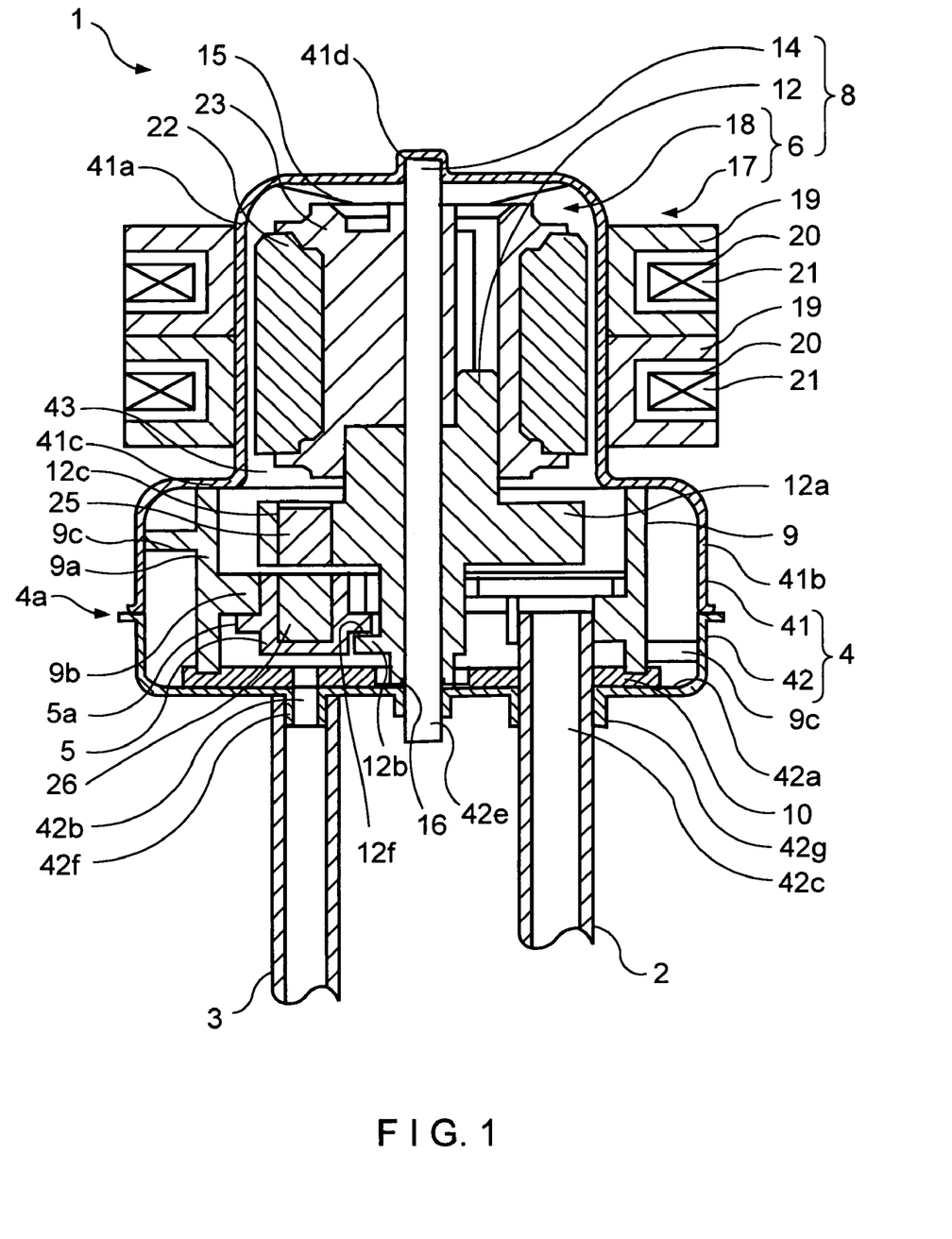
FIG. 1 is a longitudinal cross-sectional view showing a valve device in accordance with an embodiment of the present invention.
Figure 2:
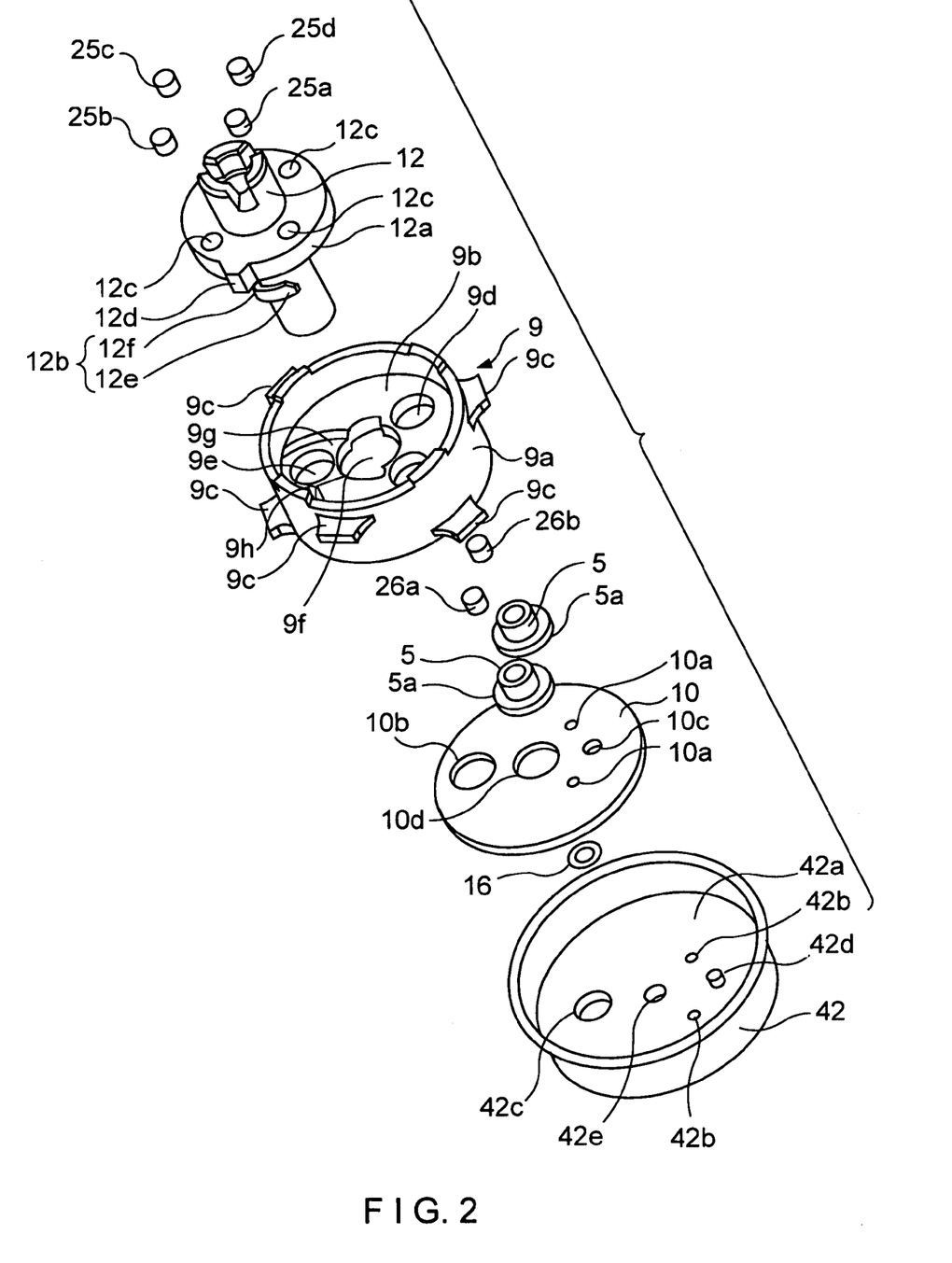
FIG. 2 is an exploded perspective view of a principal portion of the valve device shown in FIG. 1.

FIG. 1 is a longitudinal cross-sectional view showing a valve device in accordance with an embodiment of the present invention, in which valve elements are located at an open position. FIG. 2 is an exploded perspective view showing a principal portion of the valve device shown in FIG. 1.

The valve device 1 in accordance with an embodiment of the present invention is a valve device for opening or closing, for example, a flow path of refrigerant in a refrigerator to perform temperature control of a refrigerating compartment that is in communication with the flow path. The valve device 1 includes a main body case 4, valve elements 5 and a valve element drive means 8. The main body case 4 within which a fluid flow path 43 is formed is constructed such that the main body case 4 is connected to a inflow pipe 2 for allowing the refrigerant to flow into the inside of the main body case 4 and two outflow pipes 3 for allowing the refrigerant to flow out from the main body case 4, and the refrigerant flown inside from the inflow pipe 2 is guided to the outflow pipes 3 through the fluid flow path 43. The valve elements 5 are disposed inside of the main body case 4 to open or close outflow aperture parts 42b of the main body case 4 that are in communication with the outflow pipes 3. The valve element drive means 8 is provided with a motor drive part 6 for driving the valve elements 5 to open or close. A holding member 9 for holding the valve elements 5 at a position corresponding to the outflow aperture parts 42b and guiding the valve elements 5 in an open or a closed direction is disposed the inside of the main body case 4. A sealing member 10 made of an elastic member is disposed between an aperture side face part 42a of the main body case 4 having the outflow aperture part 42b and the valve element 5 in order to prevent the leakage of the refrigerant from the inside of the main body case 4 to the outflow pipe 3. In the embodiment of the present invention, one inflow pipe 2 and two outflow pipes 3 are used but the number of the respective pipes is not limited to the embodiment.

The main body case 4 comprises a first approximately cup-shaped case member 41 and a second approximately cup-shaped case member 42, which are formed of a stainless steel plate by press drawing work. The first case member 41 and the second case member 42 are coupled at a connecting part 4a in a tight contacting state by TIG (Tungsten Inert Gas) welding under the state that respective flange parts of the first case member 41 and the second case member 42 are abutted with each other. Therefore, a refrigerant receiving space which serves as a fluid flow path 43 is formed inside of the first case member 41 and the second case member 42.

The first case member 41 includes a small diameter part 41a that is formed on a bottom face side and a large diameter part 41b that is formed on the aperture part side in a larger diameter than the small diameter part 41a. A stepped part 41c is formed between the small diameter part 41a and the large diameter part 41b. On the bottom face portion of the first case member 41 is formed a recessed part 41d for supporting a shaft 14 which is included in the valve element drive means 8.

The second case member 42 is formed in an approximately cup configuration in which the bottom face portion is the aperture side face part 42a. In the aperture side face part 42a are formed two outflow aperture parts 42b which are in communication with the respective outflow pipes 3, an inflow aperture part 42c which is in communication with the inflow pipe 2, a positioning pin 42d which positions the sealing member 10, and a mounting hole 42e for the shaft 14 which is included in the valve element drive means 8 (see FIG. 2). In the embodiment of the present invention, the outflow aperture parts 42b are formed at two positions and the inflow aperture part 42c is formed at one position. In the outflow aperture part 42b is formed a cylindrical part 42f, to which the outflow pipe 3 is fitted on its outer side, so as to extend toward on the rear face side of the second case member 42 (see FIG. 1). In the inflow aperture part 42c is formed a cylindrical part 42g, to which the inflow pipe 2 is inserted on its inner side, so as to extend toward the rear face of the second case member 42 (see FIG. 1).

The valve element drive means 8 includes a motor drive part 6, a rotary member 12 and a shaft 14. The motor drive part 6 comprises a stepping motor, which includes a stator part 17 fitted on the outer peripheral face of the small diameter part 41a of the first case member 41 and a rotor part 18 disposed on the inner peripheral side of the small diameter part 41a in a freely rotatable manner. The stator part 17 comprises two stator assemblies respectively including a core 19, a coil bobbin 20 and a coil 21 wound around the coil bobbin 20, which are superposed each other in the axial direction and fixed to a holder not shown in the drawing. The rotor part 18 includes a cylindrical rotor magnet 22 and a cylindrical magnet holding member 23 formed of resin molding material for holding the rotor magnet 22 by insert-molding. The core 19 of the stator part 17 and the rotor magnet 22 of the rotor part 18 are disposed in an opposedly faced manner through the small diameter part 41a of the first case member 41.

The shaft 14 is inserted into the inner peripheral face of the magnet holding member 23 of the rotor part 18 such that the rotor part 18 is rotatably supported on the shaft 14. The rotor part 18 is pressed on the second case member 42 side by an urging member 15 disposed internally on the bottom face side of the first case member 41 all the time so as to be rotated in a prescribed position opposed to the stator part 17. One end of the shaft 14 is supported in a recessed part 41d of the first case member 41 and its another end is supported in a mounting hole 42e of the second case member 42.

The rotary member 12 is formed in an approximately cylindrical shape. The one end side of the rotary member 12 is fixed to the magnet holding member 23 and the shaft 14 is inserted into the shaft hole of the rotary member 12 such that the rotary member 12 is constructed so as to be integrally rotated along with the rotor part 18 with respect to the shaft 14. The rotary member 12 is pressed on the second case member 42 side by the urging member 15 through the magnet holding member 23 and thus the opposite end side of the rotary member 12 with respect to the one end side fixed to the magnet holding member 23 abuts with the aperture side face part 42a of the second case member 42 through a washer 16. The detailed construction of the rotary member 12 will be described below.

The holding member 9 is formed in an approximately "H" shape in a longitudinal cross section as shown in FIG. 1 with resin molding material and includes a cylindrical part 9a formed in a cylindrical shape and an intermediate bottom part 9b formed in a disk shape. On the cylindrical part 9a are formed a plurality of positioning flange parts 9c extending outward and the tip end of the flange part 9c is abutted with the inner peripheral face of the large diameter part 41b of the first case member 41 or the inner peripheral face of the second case member 42 to position the holding member 9 in the radial direction. The holding member 9 is positioned in the axial direction by means that the upper end of the cylindrical part 9a in FIG. 1 is abutted with the stepped part 41c of the first case member 41 and its lower end is urged on the aperture side face part 42a of the second case member 42 through the sealing member 10.

In the intermediate bottom part 9b of the holding member 9 are formed two valve element holding holes 9d which respectively hold the valve element 5 at a position corresponding to the outflow aperture part 42b so as to guide the valve element 5 in the opening/closing direction, one fixing hole 9e for fixing one end of the inflow pipe 2, and a passing hole 9f for passing the rotary member 12 to which the shaft 14 is inserted therethrough. As shown in FIG. 2, a stepped part 9g is formed at a periphery of the aperture part on the upper face side of the fixing hole 9e to ensure the flow path for the smooth inflow of the refrigerant from the inflow pipe 2. Also, on the upper face side of the intermediate bottom part 9b in FIG. 2 is formed a convex positioning part 9h for determining the reference position of the rotary member 12 in the rotational direction.

The sealing member 10 is formed in a disk-like shape by using an elastic member such as rubber material or resin material. The sealing member 10 in the embodiment of the present invention is formed of hydrogenated nitrile rubber (HNBR) or the like in consideration of chemical resistance to the refrigerant. The sealing member 10 is formed with two outflow aperture holes 10a provided at the position corresponding to the outflow aperture part 42b of the second case member 42, one inflow aperture hole 10b provided at the position corresponding to the inflow aperture part 42c, a positioning hole 10c into which the positioning pin 42d is inserted, and a passing hole 10d in which the rotary member 12 inserted with the shaft 14 is inserted. The respective peripheries of two outflow aperture holes 10a are surrounded with the sealing member 10. The outer peripheral edge portion of the sealing member 10 is interposed and pressed by the lower end of the cylindrical part 9a and the aperture side face part 42a and thus it is so constructed that the refrigerant flows out only from the outflow aperture hole 10a (see FIG. 1).

Construction of Magnetic Drive Means and Cam of Valve Element Drive Means 8

Figure 3A:
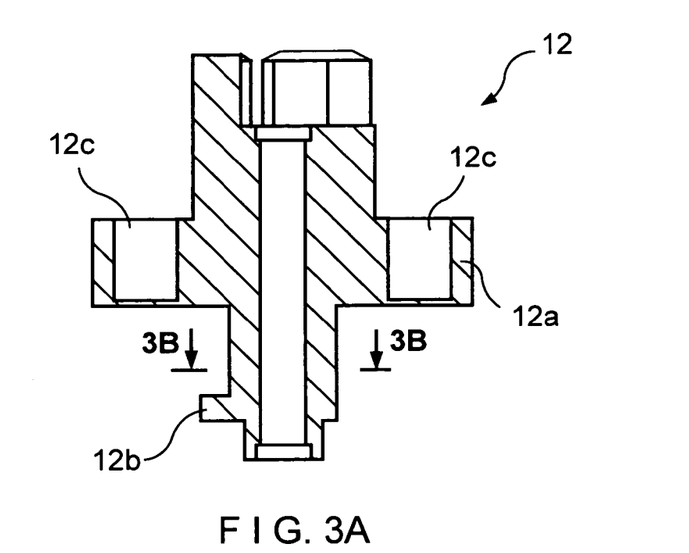
FIG. 3(A) is a longitudinal cross-sectional view showing a rotary member of the valve device shown in FIG. 1.
Figure 3B:
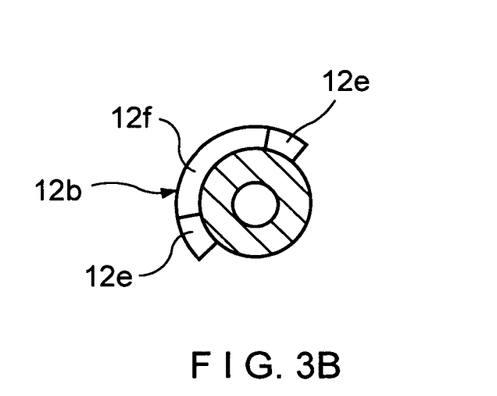
FIG. 3(B) is a cross-sectional view showing an "X-X" cross-section shown in FIG. 3(A)
Figure 3C:
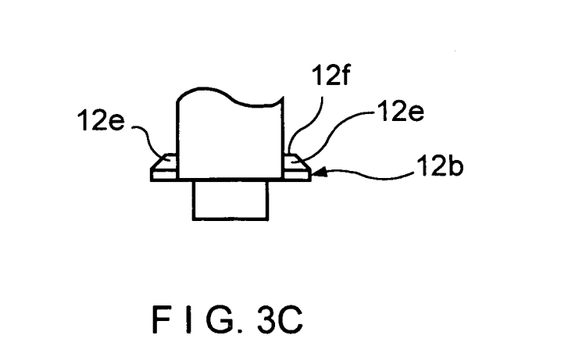
FIG. 3(C) is a fragmentary side view which is viewed from the direction of the arrow "Y" in FIG. 3(B).

FIG. 3(A) is a longitudinal cross-sectional view showing the rotary member of the valve device shown in FIG. 1, FIG. 3(B) is a cross-sectional view showing an "X-X" cross-section shown in FIG. 3(A), and FIG. 3(C) is a fragmentary side view which is viewed from the direction of the arrow "Y" in FIG. 3(B).

In the embodiment of the present invention, the valve element drive means 8 includes a magnetic drive means and a cam described below. The rotary member 12 is formed of resin molding material and includes a projecting part 12a projecting in the radial direction so as to face the valve element 5 in the opening/closing direction of the valve element 5. Further, the rotary member 12 includes a cam 12b at a lower position of the projecting part 12a in the drawing, which is capable of coming into abut with the valve element 5 in the closed state to give a trigger movement for performing the open operation of the valve element 5. The projecting part 12a of the rotary member 12 turns on the inner side of the holding member 9 at an upper portion of the intermediate bottom part 9b and the cam 12b turns on the inner side of the holding member 9 at a lower portion of the intermediate bottom part 9b with the turning of the rotary member 12 around its axial line.

Four magnet holding holes 12c are formed in the projecting part 12a at approximately equal angles along the circumferential direction in the embodiment of the present invention. On the projecting part 12a is formed a positioning projection 12d as a stopper in the circumferential direction so as to protrude outwardly, which abuts with the positioning part 9h formed on the holding member 9 to determine the reference position of the rotary member 12 in the rotational direction (see FIG. 2).

The cam 12b is formed in a flange shape in a prescribed angular range so as to protrude outward in the radial direction of the rotary member 12. The cam 12b includes a flat face part 12f and inclined face parts 12e formed to be inclined at a prescribed angle at both sides of the flat face part 12f in the circumferential direction. The cam 12b is formed in the angular range of about 180° in the circumferential direction.

The rotation side magnets 25a, 25b, 25c, 25d in a cylindrical shape are respectively inserted and fixed in the magnet holding holes 12c. A rotation side magnet part is constructed by using the rotation side magnets 25a, 25b, 25c, 25d such that an N-pole and an S-pole are alternately disposed along the circumferential direction on the lower face in the drawing, in other words, on the opposing face of the projecting part 12a to the valve element 5. In the embodiment of the present invention, the rotation side magnets 25a, 25b are magnetized in an N-pole on the lower side in the drawing or on the valve element side, and the rotation side magnets 25c, 25d are magnetized in an S-pole on the lower side, i.e., on the valve element side.

The valve element 5 is formed in a bottomed cylindrical shape made of resin molding material and includes a flange part 5a. Two valve elements 5 are respectively disposed on the inner side of the holding member 9 at positions corresponding to the outflow aperture parts 42b so as to move linearly in up and down directions in FIG. 1 along the valve element holding hole 9d of the holding member 9. In the embodiment of the present invention, two valve elements 5 are disposed at 90 degree separated positions from each other around the shaft 14. Valve element side magnets 26a, 26b in a cylindrical shape provided with a monopole on the opposing face to the projecting part 12a are respectively inserted and fixed on the inner side of the valve element 5. A valve element side magnet part comprises the valve element side magnets 26a, 26b. In the embodiment of the present invention, two valve element side magnets 26a, 26b are respectively magnetized in an S-pole on the opposing face side to the projecting part 12a.

In the embodiment of the present invention as described above, a magnetic drive means is constructed by using the rotation side magnets 25a, 25b, 25c, 25d disposed on the rotary member 12 and the valve element side magnets 26a, 26b disposed on the valve element 5 to generate an urging force for moving the valve element 5 in an open direction or in a closed direction by a magnetic attractive force or repulsive force generated by the opposed permanent magnets.

Opening and Closing Operations of Valve Element

Figure 4:
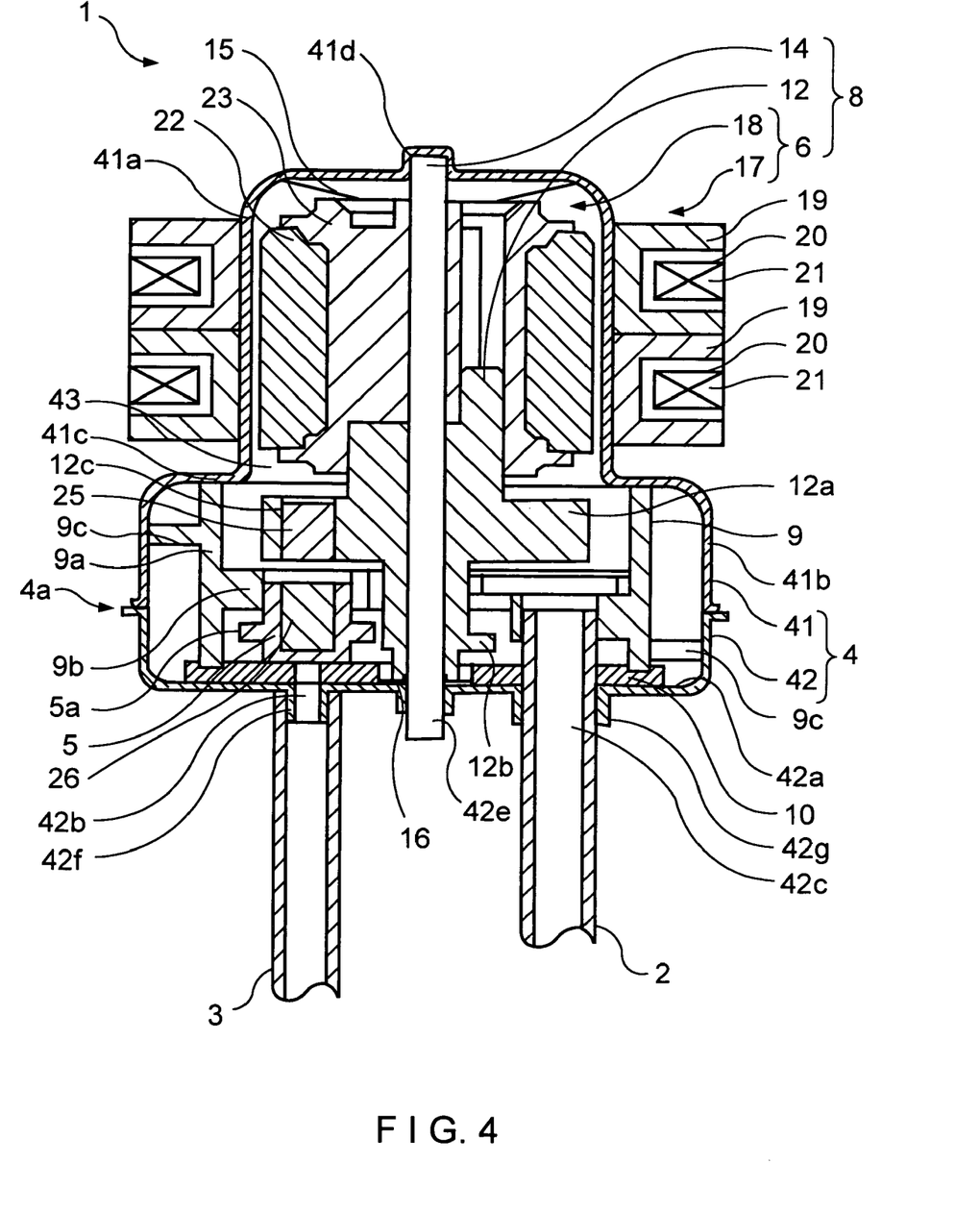
FIG. 4 is a longitudinal cross-sectional view showing a state when valve elements are in a closed position in the valve device shown in FIG. 1.

FIG. 4 is a longitudinal cross-sectional view showing a state when the valve elements are at the closed position in the valve device shown in FIG. 1. FIGS. 5(A), 5(B), 5(C), 5(D), 5(E) and 5(F) are explanatory views of the opening and closing operations of the valve elements that schematically show the opening and closing states of two valve elements according to the turning of the rotary member. FIGS. 5(A), 5(B), 5(C), 5(D), 5(E) and 5(F) schematically show the opening and closing states of two valve elements when the rotary member respectively turns 0 step, 4 steps, 28 steps, 52 steps, 76 steps, and 87 steps from a home position. FIG. 6 is a timing chart showing the opening and closing states of two valve elements according to the turning of the rotary member.

In the valve device 1 in accordance with the embodiment of the present invention, the opening or closing of the outflow aperture parts 42b are performed by means that two valve elements 5 respectively move in a linear up-and-down motion along the axial direction such that the valve element is apart from or abuts with the outflow aperture part 42b. In other words, the position where the upper face of the flange part 5a of the valve element 5 abuts with the under face of the intermediate bottom part 9b of the holding member 9 is the open position (see FIG. 1). At this time, the flat face part 12f of the cam 12b is located just under the flange part 5a in the axial direction. However, as shown in FIG. 1, a clearance is set between the under face of the flange part 5a and the flat face part 12f in the axial direction, and thus the under face of the flange part 5a does not contact with the flat face part 12f.

The position where the lower end face of the valve element 5 abuts with the sealing member 10 is the closed position (see FIG. 4). The opening and closing operations of the valve element 5 are performed such that the magnetic attractive force and the magnetic repulsive force, which is generated between the rotation side magnets 25a through 25d constructing the rotation side magnet part and the valve element side magnet 26a, 26b constructing the valve element side magnet part, are changed according to the turning of the rotary member 12, and therefore the valve element 5 moves between the open position and the closed position in the axial direction in an approximately linear manner. The opening operation is performed such that the inclined face part 12e of the cam 12b formed on the rotary member 12 comes into contact with and moves the flange part 5a of the valve element 5 positioned in the closed state.

The opening and closing operations of the valve element 5 will be concretely described below with reference to FIGS. 5 and 6. In the embodiment of the present invention, the rotary member 12 turns approximately one revolution with 87 steps by means of the motor drive part 6, which is a stepping motor, to control the opening and closing operations of the valve element 5. In FIG. 5, for convenience of explanation, the first valve element 51 is set at the position of 90 degrees from the positioning part 9h in the counterclockwise direction and the second valve element 52 is set at the position of 180 degrees from the positioning part 9h in the counterclockwise direction, and the modes corresponding to the following states are obtained.

"OPEN and CLOSED" mode:
the first valve element 51 is at the open position and the second valve element 52 is at the closed position.
"OPEN and OPEN" mode:
both the first valve element 51 and the second valve element 52 are at the open position.
"CLOSED and OPEN" mode:
the first valve element 51 is at the closed position and the second valve element 52 is at the open position.
"CLOSED and CLOSED" mode:
both the first valve element 51 and the second valve element 52 are at the closed position.

In FIGS. 5(A) through 5(F), the symbol "N" (N-pole) or the symbol "S" (S-pole) added in the parenthesis following the respective notational symbols of the magnets indicates the magnetic pole, i.e., an N-pole or an S-pole, of the respective opposed faces of the rotation side magnets 25a, 25b, 25c, 25d and the valve element side magnets 26a, 26b.

(Home Position)

Figure 5A:
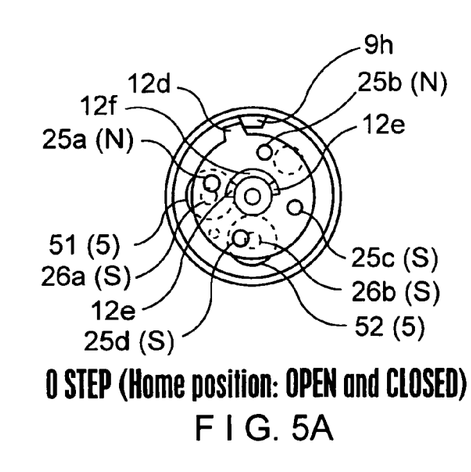
FIGS. 5(A) through 5(F) are explanatory views of the opening/closing operation of the valve element which schematically show opening/closing states of two valve elements according to the turning of the rotary member in the valve device shown in FIG. 1.
Figure 6:
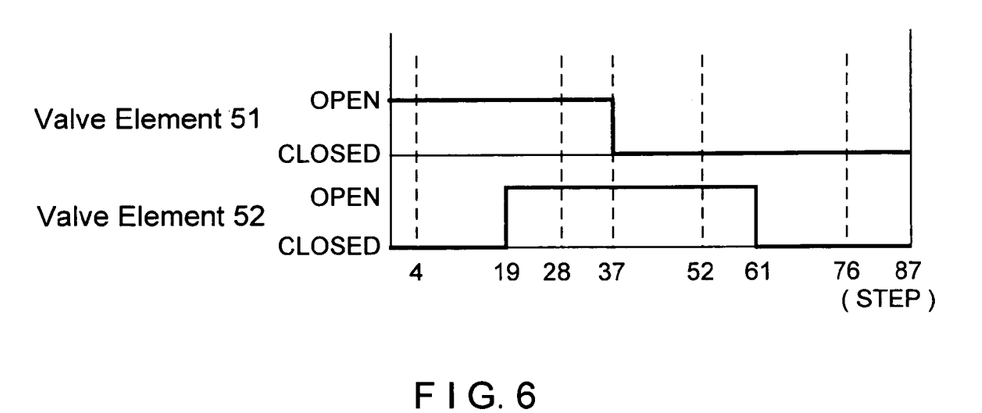
FIG. 6 is a timing chart showing the opening/closing states of two valve elements according to the turning of the rotary member in the valve device shown in FIG. 1.

As shown in FIG. 5(A) and FIG. 6, in the home position (zero step), the positioning projection 12d of the rotary member 12 abuts with the positioning part 9h of the holding member 9 in the clockwise direction, and the rotation side magnet 25a (N-pole) is positioned in the vicinity of the valve element side magnet 26a (S-pole). Accordingly, a magnetic attractive force is generated between the rotation side magnet 25a and the valve element side magnet 26a to attain the open position where the first flange part 5a of the valve element 51 and the intermediate bottom part 9b abut with each other and the outflow aperture part 42b is opened (see FIG. 1). In this case, the cam 12b is positioned just under the flange part 5a in the axial direction. However, as shown in FIG. 1, a clearance in the axial direction is formed between the under face of the flange part 5a and the cam 12b so that the under face of the flange part 5a and the cam 12b are in a non-contact state. In the embodiment of the present invention, when the valve elements 51, 52 are positioned in the open state, the under face of the flange part 5a and the flat face part 12f are in a non-contact state.

In FIG. 5(A), the valve element side magnet 26b (S-pole) in the second valve element 52 is in the vicinity of the rotation side magnet 25d (S-pole). Therefore, a magnetic repulsive force is generated between the rotation side magnet 25d and the valve element side magnet 26b to be at the closed position where the lower end face of the valve element 52 and the sealing member 10 abut with each other and thus the outflow aperture part 42b becomes to be in the closed state (see FIG. 4). When the valve element 51 or 52 is at the closed position, the pressure of the refrigerant acts on the valve element 51 or 52 to press the valve element 51 or 52 against the outflow aperture part 42b.

("OPEN and CLOSED" Mode)

Figure 5B:
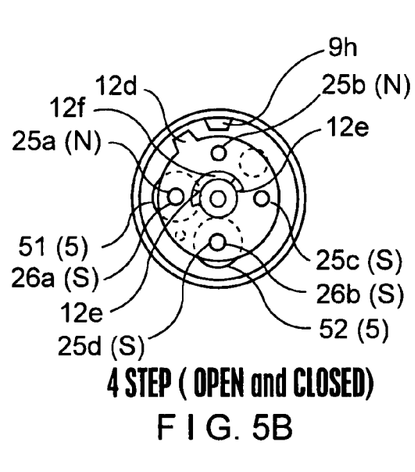

As shown in FIG. 5(B) and FIG. 6, when the rotary member 12 rotates four steps from the home position in the counterclockwise direction, the rotation side magnet 25a (N-pole) is at completely opposed position with the valve element side magnet 26a (S-pole) of the first valve element 51 in the axial direction and the magnetic attractive force is operated between both the magnets, and thus the first valve element 51 is at the open position.

In FIG. 5(B), in the second valve element 52, the valve element side magnet 26b (S-pole) of the second valve element 52 is at completely opposed position with the rotation side magnet 25d (S-pole) in the axial direction and the magnetic repulsive force is operated between the magnets. Therefore, the second valve element 52 continues at the closed position.

(Transition from "OPEN and CLOSED" Mode to "OPEN and OPEN" Mode)

As shown in FIG. 6, when the rotary member 12 turns 19 steps from the home position in the counterclockwise direction, the second valve element 52 moves from the closed position to the open position and thus a transition from the "OPEN and CLOSED" mode to the "OPEN and OPEN" mode is performed. In this state, the rotation side magnet 25b (N-pole) is located in the vicinity of the valve element side magnet 26a (S-pole) in the first valve element 51 and a magnetic attractive force is generated. Therefore, the first valve element 51 continues the open state.

In the second valve element 52, the rotation side magnet 25a (N-pole) is in the vicinity of the valve element side magnet 26b (S-pole) and a magnetic attractive force is generated. Therefore, the open operation is performed in which the valve element 52 moves in an approximately linear manner to the open position where the flange part 5a of the valve element 52 abuts with the intermediate bottom part 9b by the magnetic attractive force between the rotation side magnet 25a and the valve element side magnet 26b, and thus the outflow aperture part 42b becomes in an open state. In this case, the inclined face part 12e of the cam 12b comes into contact with the flange part 5a of the valve element 52 to apply a force and give a trigger motion in the upward direction to the valve element 52, which moves the valve element 52 upward to perform the opening operation. Then, the valve element side magnet 26b of the second valve element 52 is moved to the open position by the magnetic attractive force with the rotation side magnet 25a and thus the inclined face part 12e and the flange part 5a do not continue to contact with each other even when the rotary member 12 further continues to turn.

("OPEN and OPEN" Mode)

Figure 5C:
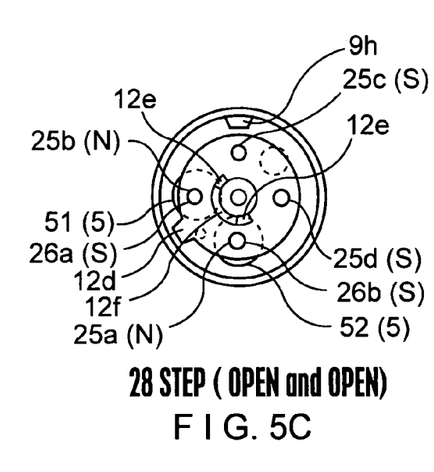

As shown in FIG. 5(C) and FIG. 6, when the rotary member 12 turns 28 steps from the home position in the counterclockwise direction, the rotation side magnet 25*b* (N-pole) and the valve element side magnet 26*a* (S-pole) of the first valve element 51 are completely opposed in the axial direction and the magnetic attractive force is operated between the magnets, and thus the valve element 51 is in the open state.

In the second valve element 52, the rotation side magnet 25*a* and the valve element side magnet 26*b* are completely opposed with each other in the axial direction and the magnetic attractive force is operated between the magnets and thus the valve element 52 becomes to be the open state.

(Transition from "OPEN and OPEN" Mode to "CLOSED and OPEN" Mode)

As shown in FIG. 6, when the rotary member 12 turns 37 steps from the home position in the counterclockwise direction, the first valve element 51 moves from the open position to the closed position and thus the transition from the "OPEN and OPEN" mode to the "CLOSED and OPEN" mode is performed. In this state, the rotation side magnet 25*c* (S-pole) is in the vicinity of the valve element side magnet 26*a* (S-pole) of the first valve element 51 and a magnetic repulsive force is generated. Therefore, a closing operation is performed in which the valve element 51 moves in an approximately linear manner to the closed position where the lower end face of the valve element 51 and the sealing member 10 abut with each other and the outflow aperture part 42*b* becomes to be the closed state. In this state, since the cam 12*b* comes to be at a position apart from the flange part 5*a* in the axial direction, the cam 12*b* does not disturb the closed operation of the valve element 51.

In FIG. 6, in the second valve element 52, the rotation side magnet 25*b* (N-pole) is in the vicinity of the valve element side magnet 26*b* (S-pole) and a magnetic attractive force is operated. Therefore, the valve element 52 continues to be in the open state.

("CLOSED and OPEN" Mode)

Figure 5D:
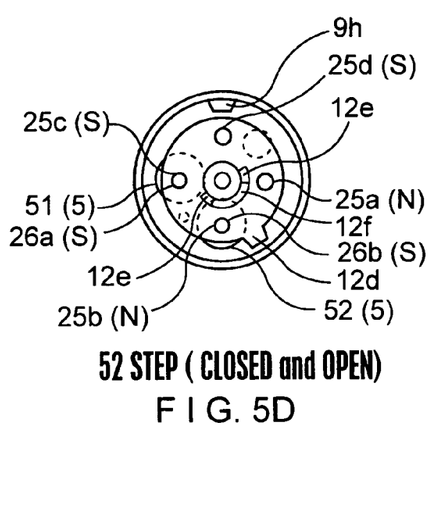

As shown in FIG. 5(D) and FIG. 6, when the rotary member 12 turns 52 steps from the home position in the counterclockwise direction, the rotation side magnet 25*c* (S-pole) is completely opposed in the axial direction with the valve element side magnet 26*a* (S-pole) of the first valve element 51 and the magnetic repulsive force is operated between the magnets, and therefore the valve element 51 is in the closed state.

In the second valve element 52, the rotation side magnet 25*b* (N-pole) is completely opposed in the axial direction with the valve element side magnet 26*b* (S-pole) and the magnetic attractive force is operated between the magnets, and thus the valve element 52 continues to be in the open state.

(Transition from "CLOSED and OPEN" Mode to "CLOSED and CLOSED" Mode)

As shown in FIG. 6, when the rotary member 12 turns 61 steps from the home position in the counterclockwise direction, the second valve element 52 moves from the open position to the closed position and thus the transition from the "CLOSED and OPEN" mode to the "CLOSED and CLOSED" mode is performed. In this state, the rotation side magnet 25*d* (S-pole) is in the vicinity of the valve element side magnet 26*a* (S-pole) of the first valve element 51 and they face each other at the position where the magnetic repulsive force is operated. Therefore, the valve element 51 continues to be in the closed state.

In the second valve element 52, the rotation side magnet 25*c* (S-pole) is in the vicinity of the valve element side magnet 26*b* (S-pole) and the closing operation is performed in which the valve element 52 moves in an approximately linear manner to the closed position where the lower end face of the valve element 52 and the sealing member 10 abut with each other by the magnetic repulsive force. Therefore, the outflow aperture part 42*b* becomes to be in the closed state. In this case, as described above, the cam 12*b* does not disturb the closing operation of the valve element 52

("CLOSED and CLOSED" Mode)

Figure 5E:
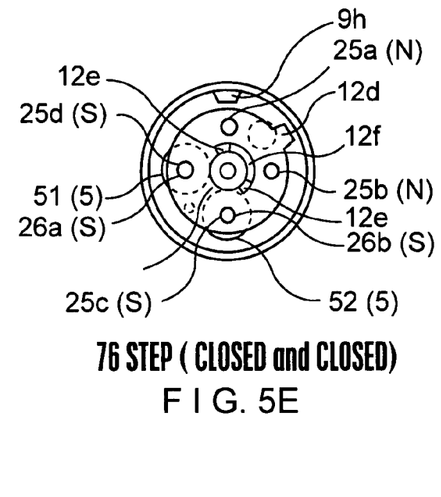

As shown in FIG. 5(E) and FIG. 6, when the rotary member 12 turns 76 steps from the home position in the counterclockwise direction, the rotation side magnet 25*d* (S-pole) is completely opposed in the axial direction with the valve element side magnet 26*a* (S-pole) of the first valve element 51 and the magnetic repulsive force is operated between the magnets, and thus the valve element 51 continues to be in the closed state.

In the second valve element 52, the rotation side magnet 25*c* (S-pole) is completely opposed in the axial direction with the valve element side magnet 26*b* (S-pole) and the magnetic repulsive force is operated between the magnets, and thus the valve element 52 is in the closed state.

(Terminal Position)

Figure 5F:
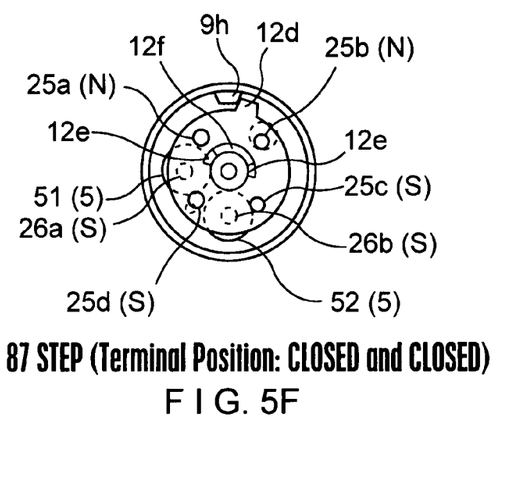

As shown in FIG. 5(F) and FIG. 6, when the rotary member 12 turns 87 steps from the home position in the counterclockwise direction, in other words, when the rotary member 12 turns approximately one revolution, the rotary member 12 reaches at the terminal position and the first valve element 51 and the second valve element 52 are respectively in the closed state.

(Reverse Operation)

When the rotary member 12 turns in the clockwise direction from the terminal position, the opening and closing operations of the valve elements 51, 52 are performed in the reversed order as follows. The valve element 51 is "CLOSED" and the valve element 52 is "CLOSED" ("CLOSED and CLOSED" mode) ▯the valve element 51 "CLOSED" and the valve element 52 "OPEN" ("CLOSED and OPEN" mode) ▯the valve element 51 "OPEN" and the valve element 52 "OPEN" ("OPEN and OPEN" mode) ▯the valve element 51 "OPEN" and the valve element 52 "CLOSED" ("OPEN and CLOSED" mode). Even when the rotary member 12 turns in the reverse direction at a midway position, the transfer of the mode is similarly reversibly performed.

Effects of the Embodiment

As described above, in the valve device 1 in accordance with the embodiment of the present invention, the opening and closing of the outflow aperture part 42*b* are performed by the magnetic drive means constructed as the valve element drive means 8, which is concretely constructed by using the rotation side magnets 25*a* through 25*d* as the rotation side magnet part and the valve element side magnets 26*a*, 26*b* as the valve element side magnet part. Therefore, the opening and closing operations of the valve element 5 can be performed while the valve element 5 is maintained in a non-contact state between the rotary member 12 and the motor drive part 6. As a result, the variation factors of required torque in the motor drive part 6 can be reduced, which are, for example, the variation of the sliding resistance of the valve element or the variation of the contacting resistance between the valve element and the valve element drive means occurred in the conventional valve opening/closing device. Therefore, the variation of the required torque in the motor drive part 6 due to the opening and closing operations of valve element 5 can be restricted.

Especially in the embodiment of the present invention, the valve element drive means 8 includes the rotary member 12 having the projecting part 12a which projects in the radial direction so as to face the valve element 5 in the opening and closing direction of the valve element 5. The projecting part 12a is provided with the rotation side magnet part having four poles with two N-poles and two S-poles (rotation side magnets 25a through 25d) on the opposing face to the valve element 5. Further, the valve element 5 is provided with the valve element side magnet part having S-poles (valve element side magnet 26a and 26b) on the opposing face to the projecting part 12a. In addition, the valve element 5 moves in an approximately linear manner between the open position and the closed position by means that the magnetic attractive force and the magnetic repulsive force, which are generated between the rotation side magnets 25a through 25d constructing the rotation side magnet part and the valve element side magnet 26a, 26b constructing the valve element side magnet part, are changed to each other according to the turning of the rotary member 12. As a result, the opening and closing of the outflow aperture part 42b are performed. Therefore, the rotating torque of the motor drive part 6 is not directly used on the opening and closing operations of the valve element 5. Accordingly, the affection of the required torque in the motor drive part 6 due to the opening and closing operations of the valve element 5 can be restricted and thus the stable opening and closing control of the valve element 5 can be attained.

In the embodiment of the present invention, the outflow aperture part 42b is set to be in the closed state by the valve element 5 with the use of the magnetic repulsive force between the rotation side magnets 25a through 25d constructing the rotation side magnet part and the valve element side magnet 26a or 26b constructing the valve element side magnet part. Alternatively, the outflow aperture part 42b is set to be in the open state by the magnetic attractive force between the rotation side magnet part and the valve element side magnet part. Therefore, the opening and closing operations of the valve element 5 can be performed with a simple construction, in which the rotation side magnet part provided in the rotary member 12 and the valve element side magnet part provided in the valve element 5 are disposed so as to be opposed to each other.

When the valve element 5 is at the closed position, the valve element 5 is received with the pressure of the refrigerant in the direction pressing on the outflow aperture part 42b. Therefore, the opening operation may not be surely performed by using only the magnetic attractive force between the rotation side magnets 25a through 25d and the valve element side magnet 26a or 26b. However, in the embodiment of the present invention, the rotary member 12 is provided with the cam 12b which gives a trigger movement to perform the opening operation of the valve element 5 by contacting with the valve element 5. In other words, the inclined face part 12e of the cam 12b contacts with the flange part 5a of the valve element 5 to apply a force in the upward direction in FIG. 4 to the valve element 5, which serves as the trigger movement for the opening operation to the valve element 5. Therefore, the opening operation of the valve element 5 can be smoothly performed. Further, in the embodiment of the present invention, the valve element 5 to which the trigger force of the opening operation is applied moves to the open position by the magnetic attractive force operated between the rotation side magnets 25a through 25d and the valve element side magnet 26a or 26b, and thus the inclined face part 12e of the cam 12b does not continue to contact with the flange part 5a of the valve element 5 even when the rotary member 12 continues to turn. Accordingly, the affection to the required torque in the motor drive part 6 due to the cam 5 is reduced.

In addition, in the embodiment of the present invention, the disk-shaped sealing member 10 made of an elastic member is disposed between the valve element 5 and the aperture side face part 42a of the second case member 42 in which the outflow aperture part 42b is formed. Therefore, when the valve element 5 is at the closed position, the air tightness within the main body case 4 is ensured with the simple construction that the valve element 5 and the sealing member 10 are urged in the axial direction by the pressure of the refrigerant and the magnetic repulsive force between the rotation side magnets 25a through 25d and the valve element side magnet 26a or 26b. Accordingly, a high degree of accuracy of the components such as the valve element 5 and the sealing member 10 is not required and thus the product cost can be reduced. Especially in the embodiment of the present invention, since the valve element 5 linearly moves in the axial direction to perform the opening operation or the closing operation, the affection to the required torque in the motor drive part 6 due to the opening/closing operation of the valve element 5 is reduced even when the sealing member 10 comprising of an elastic member is provided.

Other Embodiments

Figure 7:
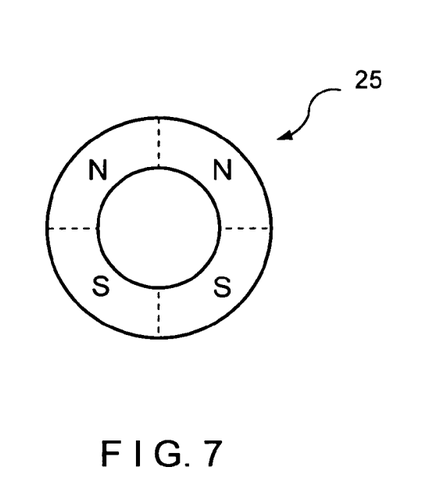
FIG. 7 is a plan view showing a rotating side magnet part in the valve device shown in FIG. 1 in accordance with another embodiment of the present invention.

The present invention has been described in detail using the embodiments, but the present invention is not limited to the embodiments described above and many modifications can be made without departing from the present invention. For example, in the above-mentioned embodiment, the rotation side magnet part is constructed such that the rotation side magnets 25a through 25d in a cylindrical shape are respectively fit into the magnet holding hole 12c of the projecting part 12a. However, as shown in FIG. 7, the rotation side magnet part may be constructed such that the rotation side magnet 25 comprising, for example, a ring-shaped magnet having four poles with two N-poles and two S-poles in the circumferential direction is fixed to the projecting part 12a of the rotary member 12. Further, the rotation side magnet part may be provided with two poles with an N-pole and an S-pole on the opposed face to the valve element 5. Also, the number of poles of the rotation side magnet part can be modified according to the number and arranging position of the valve elements 5.

In the above-mentioned embodiment, the rotary member 12 is provided with the cam 12b. However, the opening operation of the valve element 5 may be performed only by the magnetic attractive force generated between the rotation side magnet part and the valve element side magnet part without using the cam 12b when the pressure of the refrigerant is low. In addition, the opening/closing order of the valve element 5 and the number of steps from the home position at the transition of opening/closing can be set freely by changing the arrangement of the rotation side magnets 25a through 25d and the shape of the cam 12b.

In the embodiment of the present invention, the opening and closing operations of the valve element 5 are performed by the magnetic drive means. However, the valve device may be constructed such that the variation of the torque required in the motor drive part 6 is restricted by using the urging force occurred by the magnetic drive means as an auxiliary force for the opening and closing operations of the valve element 5.

In the above-mentioned embodiment, the valve device 1 is used to open or close the flow path for refrigerant of a refrigerator to perform temperature control in a refrigerating compartment in communication with the flow path. However, the valve device in accordance with the embodiment of the present invention may be applied to other equipments such as an air conditioner. In addition, the fluid is not limited to the refrigerant and the valve device in accordance with the embodiment of the present invention can be applied for various fluids.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A valve device comprising:
    a main body case to which an inflow pipe allowing fluid to flow in and an outflow pipe allowing fluid to flow out are connected;
    a fluid flow path formed inside of the main body case for allowing the fluid flown in from the inflow pipe to flow to the outflow pipe;
    a valve element which is disposed inside of the main body case to open or close an outflow aperture part of the main body case which is in communication with the outflow pipe;
    a valve element drive means including a motor drive part for opening or closing the valve element, said motor driver part having a rotor part that is rotated about a rotary center axis of the motor; and
    magnetic drive means included in the valve element drive means for generating an urging force to move the valve element in at least one of an open direction or a closed direction by using at least one of a magnetic attractive force and a magnetic repulsive force generated with permanent magnets
    a rotary member included in the valve element drive means so as to be opposed to the valve element;
    a rotation side magnet part as one of the permanent magnets of the magnetic drive means, which includes an N-pole and an S-pole at different angle positions of the rotary member; and
    a valve element side magnet part as the other of the permanent magnets of the magnetic drive means,
    wherein the magnetic drive means is constructed such that a force generated between the rotation side magnet part and the valve element side magnet part is interchanged to the magnetic attractive force or to the magnetic repulsive force to drive the valve element in the open direction or in the closed direction,
    wherein the outflow aperture part and the valve element are comprised of at least two outflow aperture parts and at least two valve elements
    wherein a cam is provided on the rotary member for engaging with the valve element in a closed state to move the valve element in the open direction.

2. The valve device according to claim 1, wherein the valve element drive means is constructed such that a force generated by the magnetic drive means is interchanged to the magnetic attractive force or to the magnetic repulsive force to reverse a direction of the urging force to drive the valve element in the open direction or in the closed direction.

3. The valve device according to claim 1, wherein the valve element is disposed to move at an open position apart from the outflow aperture part and at a closed position closing the outflow aperture part.

4. The valve device according to claim 3, wherein the valve element drive means is constructed such that the valve element is moved in the closed direction by using the magnetic repulsive force between the rotation side magnet part and the valve element side magnet part and the valve element is moved in the open direction by using the magnetic attractive force between the rotation side magnet part and the valve element side magnet part.

5. The valve device according to claim 1, further comprising a sealing member formed of an elastic member disposed between the valve element and an aperture side face part of the main body case in which the outflow aperture part is formed.

6. The valve drive according to claim 1, wherein a valve element drive means further comprises a fixed shaft to which the rotor part provided with a rotor magnet of the motor and the rotary member are rotatably mounted and the outflow aperture parts and the valve elements are arranged in a direction of an axis of the fixed shaft with respect to the rotary member.

7. The valve drive according to claim 6, wherein the motor is stepping motor which is comprises of a stator which is provided on an outer side of the main body case and the rotor part is provided with the rotor magnet of the motor which is disposed on an inner side of the main body case.

8. The valve device according to claim 1, wherein the valve element drive means further includes a fixed shaft to which the rotor part is provided with a rotor magnet of the motor and the rotary member are rotatably mounted and the outflow aperture parts and the valve elements are arranged in a direction of an axis of the fixed shaft with respect to the rotary member.

9. The valve device according to claim 1, wherein the motor is a stepping motor which is comprised of a stator which is provided on an outer side of the main body case and the rotor part is provided with the rotor magnet of the motor which is disposed on an inner side of the main body case.

10. A valve device comprising:
    a main body case to which an inflow pipe allowing fluid to flow in and an outflow pipe allowing the fluid to flow out are connected;
    a fluid flow path formed inside of the main body case for allowing the fluid flown in from the inflow pipe to flow to the outflow pipe;
    a valve element which is disposed inside of the main body case to open or close an outflow aperture part of the main body case which is in communication with the outflow pipe;

a motor for moving the valve element in an open direction and a closed direction, and the motor includes a rotor part that is rotated about a rotary center axis of the motor;

valve element drive means which is driven by the motor and includes a rotary member rotated by the motor and a rotation side permanent magnet mounted in the rotary member;

a valve element side permanent magnet mounted in the valve element; and a holding member which movably holds the valve element such that the valve element moves between an open position where the outflow aperture part is in an open state and a closed position where the outflow aperture part is in a closed state;

a rotary member is fixed to the rotor part so as to be integrally rotated with the rotor part of the motor about the rotary center axis;

wherein the valve element is urged in the open direction or the closed direction by a magnetic attractive force or a magnetic repulsive force generated between the rotation side permanent magnet and the valve element side permanent magnet through a rotation of the motor to move the valve element between the open position and the closed position, wherein the outflow aperture part and the valve element are comprised of at least two outflow aperture parts and at least two valve elements wherein the rotation side magnet part is comprised of at least two rotation side magnet parts which are disposed in the peripheral direction of the rotary member;

wherein the valve elements are provided with a valve element side magnet part and are provided so as to face the rotary member in a direction of the rotary center axis and movable in the direction of the rotary center axis to drive the valve element in the open direction or in the closed direction wherein the valve element is movably mounted in the holding member to move in a parallel direction to a rotational axis of the rotary member to be the open position or the closed position, and the rotation side permanent magnet and the valve element side permanent magnet are opposed to each other in a direction of the rotational axis of the rotary member, wherein a cam having an inclined face part is integrally provided on the rotary member for abutting with the valve element at the closed position to move the valve element in the open direction.

11. The valve device according to claim 10, wherein two outflow aperture parts are formed and two valve elements are disposed at positions corresponding to the respective outflow aperture parts in the direction of the rotational axis of the rotary member, and the two outflow aperture parts provide four modes of "OPEN and CLOSED" mode, "OPEN and OPEN" mode, "CLOSED and OPEN" mode, and "CLOSED and CLOSED" mode while the rotary member turns approximately one revolution.

12. The valve device according to claim 11, wherein the two outflow aperture parts and the two valve elements are respectively provided at an angular position of approximately 90 degrees with respect to the rotation axis of the rotary member.

13. The valve device according to claim 10, further comprising a positioning part provided on the main body case for determining a reference position of the rotary member in a rotation direction.

14. The valve device according to claim 10, further comprising a sealing member formed of an elastic member disposed between the valve element and an aperture side face part of the main body case in which the outflow aperture part is formed.

15. The valve device according to claim 14, further comprising:

an intermediate bottom part provided in the holding member which includes a valve element holding hole at a position corresponding to the outflow aperture part for holding the valve element so as to move the valve element in the open or closed direction; and a cylindrical part in a cylindrical shape provided in the holding member which is formed on an outer side of the intermediate bottom part, wherein the sealing member is pressed against the aperture side face part of the main body case by the cylindrical part of holding member.

16. The valve drive according to claim 10, wherein a valve element drive means further comprises a fixed shaft to which the rotor part provided with a rotor magnet of the motor and the rotary member are rotatably mounted and the outflow aperture parts and the valve elements are arranged in a direction of an axis of the fixed shaft with respect to the rotary member.

17. The valve device according to claim 10, wherein the motor is a stepping motor which is comprised of a stator which is provided on an outer side of the main body case and the rotor part is provided with the rotor magnet of the motor which is disposed on an inner side of the main body case.

18. A valve device comprising:

a main body case to which an inflow pipe allowing fluid to flow in and an outflow pipe allowing the fluid to flow out are connected;

a fluid flow path formed inside of the main body case for allowing the fluid flown in from the inflow pipe to flow to the outflow pipe;

a valve element which is disposed inside of the main body case to open or close an outflow aperture part of the main body case which is in communication with the outflow pipe;

a motor for moving the valve element in an open direction and a closed direction, and the motor includes a rotor part that is rotated about a rotary center axis of the motor;

valve element drive means which is driven by the motor and includes a rotary member rotated by the motor and a rotation side permanent magnet mounted in the rotary member;

a valve element side permanent magnet mounted in the valve element; and a holding member which movably holds the valve element such that the valve element moves between an open position where the outflow aperture part is in an open state and a closed position where the outflow aperture part is in a closed state;

a rotary member is fixed to the rotor part so as to be integrally rotated with the rotor part of the motor about the rotary center axis;

wherein the valve element is urged in the open direction or the closed direction by a magnetic attractive force or a magnetic repulsive force generated between the rotation side permanent magnet and the valve element side permanent magnet through a rotation of the motor to move the valve element between the open position and the closed position, wherein the outflow aperture part and the valve element are comprised of at least two outflow aperture parts and at least two valve elements wherein the rotation side magnet part is comprised of at least two rotation side magnet parts which are disposed in the peripheral direction of the rotary member;

wherein the valve elements are provided with a valve element side magnet part and are provided so as to face the rotary member in a direction of the rotary center axis and movable in the direction of the rotary center axis to drive the valve element in the open direction or in the closed direction wherein two outflow aperture parts are formed and two valve elements are disposed at positions corresponding to the respective outflow aperture parts in the direction of the rotational axis of the rotary member, and the two outflow aperture parts provide four modes of "OPEN and CLOSED" mode, "OPEN and OPEN" mode, "CLOSED and OPEN" mode, and "CLOSED and CLOSED" mode while the rotary member turns approximately one revolution, wherein the two outflow aperture parts and the two valve elements are respectively provided at an angular position of approximately 90 degrees with respect to the rotation axis of the rotary member.

19. The valve device according to claim 18, further comprising a positioning part provided on the main body case for determining a reference position of the rotary member in a rotation direction.

20. The valve device according to claim 18, further comprising a sealing member formed of an elastic member disposed between the valve element and an aperture side face part of the main body case in which the outflow aperture part is formed.

21. The valve device according to claim 20, further comprising:

an intermediate bottom part provided in the holding member which includes a valve element holding hole at a position corresponding to the outflow aperture part for holding the valve element so as to move the valve element in the open or closed direction; and a cylindrical part in a cylindrical shape provided in the holding member which is formed on an outer side of the intermediate bottom part, wherein the sealing member is pressed against the aperture side face part of the main body case by the cylindrical part of holding member.

22. The valve drive according to claim 18, wherein the valve element drive means further comprises a fixed shaft to which the rotor part provided with a rotor magnet of the motor and the rotary member are rotatably mounted and the outflow aperture parts and the valve elements are arranged in a direction of an axis of the fixed shaft with respect to the rotary member.

23. The valve device according to claim 18, wherein the motor is a stepping motor which is comprised of a stator which is provided on an outer side of the main body case and the rotor part is provided with the rotor magnet of the motor which is disposed on an inner side of the main body case.

* * * * *